United States Patent [19]
Poole

[11] 3,931,480
[45] Jan. 6, 1976

[54] TIME COMPRESSION RECEIVER

[75] Inventor: Margaret A. Poole, Wayland, Mass.

[73] Assignee: GTE Sylvania Incorporated, Stamford, Conn.

[22] Filed: Sept. 4, 1974

[21] Appl. No.: 502,939

[52] U.S. Cl. .............................................. 179/84 VF
[51] Int. Cl.² ......................................... H04M 1/50
[58] Field of Search ......... 179/84 R, 84 VF, 15 BY, 179/15 AT

[56] References Cited
UNITED STATES PATENTS

| | | | |
|---|---|---|---|
| 3,445,606 | 5/1969 | Brightman | 179/84 VF |
| 3,578,919 | 5/1971 | O'Neill | 179/84 VF |
| 3,773,981 | 11/1973 | Stilwell | 179/15 BY |
| 3,794,763 | 2/1974 | Bolidweijns | 179/1 VC |

Primary Examiner—Kathleen H. Claffy
Assistant Examiner—Joseph Popek
Attorney, Agent, or Firm—David M. Keay; Elmer J. Nealon; Norman J. O'Malley

[57] ABSTRACT

Time compression receiver for detecting the signalling tones in a DTMF (dual tone multi-frequency) format present on eight receiver input lines. A multiplexer repeatedly samples the input signals present on the eight input lines. These analog samples are converted to digital samples and stored in a memory. Stored samples are read out for each input line in order while new samples are being written into the memory. Samples are read out at twice the rate they are written in. The samples are converted to analog signals and passed through a low pass filter. The frequencies present in the resulting signal are speeded up by a factor of sixteen over the frequencies of the signalling tones present in the input signal from which it was derived. The signal frequencies are passed through reject filters, comparator and limiter circuits, a bank of tone filters, and level detectors to check for each possible resulting frequency and to produce an indication of the presence or absence of each.

6 Claims, 9 Drawing Figures

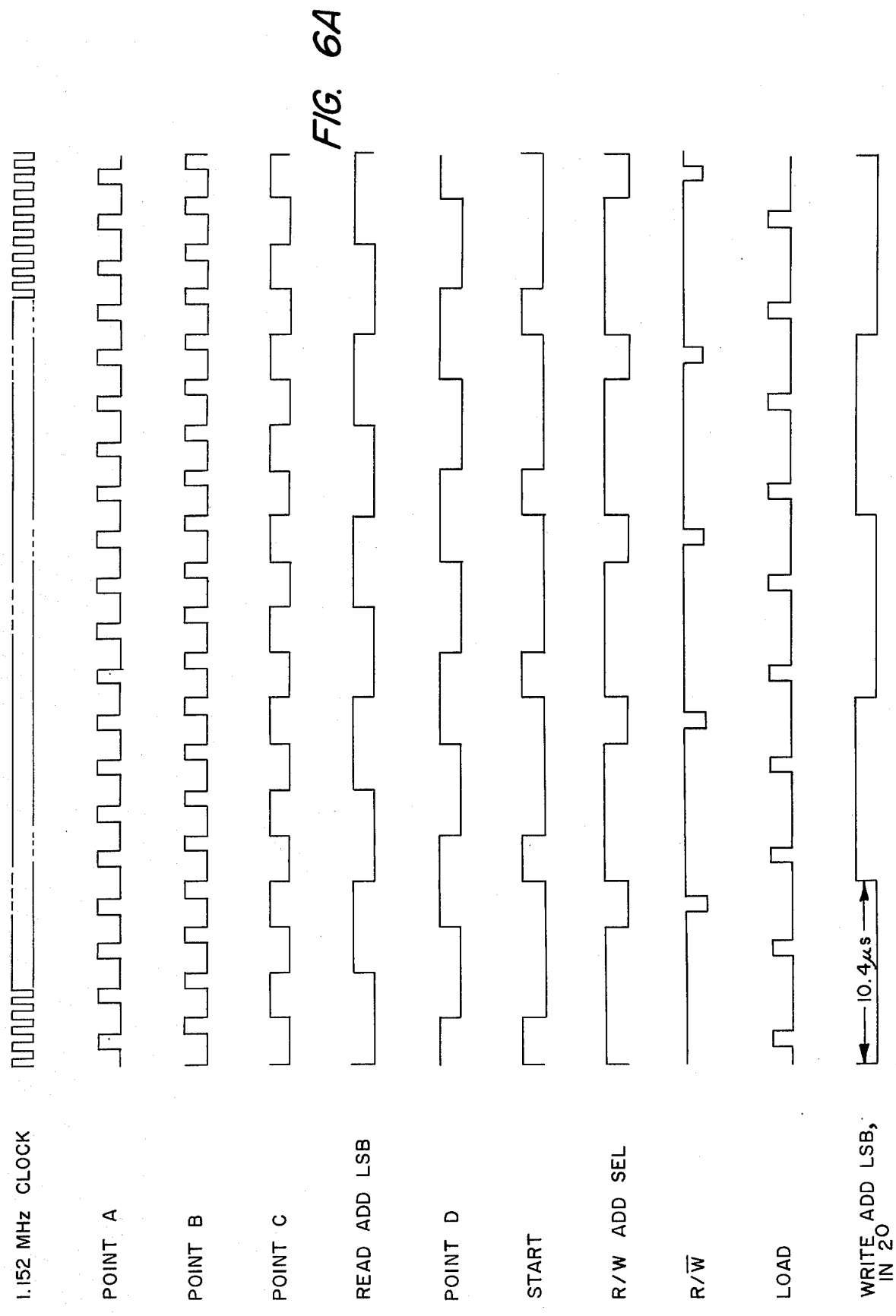

| | INPUT 1 | INPUT 2 | INPUT 3 | INPUT 4 | INPUT 5 | INPUT 6 | INPUT 7 | INPUT 8 |
|---|---|---|---|---|---|---|---|---|
| | 0 | 1 | 2 | 3 | 4 | 5 | 6 | 7 |
| | | 171 | | | | | | |
| | | 201 | | | | | | |
| | | | 372 | | | | | |
| | | | 402 | | | | | |
| | | | | 573 | | | | |
| | | | | 603 | | | | |
| | | | | | 774 | | | |
| | | | | | 1004 | | | |
| | | | | | | 1175 | | |
| | | | | | | 1205 | | |
| | | | | | | | 1376 | |
| | | | | | | | 1406 | |
| | | | | | | | | 1577 |
| | | | | | | | | 1607 |
| | 1770 | | | | | | | |
| | 2000 | | | | | | | |
| | | 2171 | | | | | | |
| | | 2201 | | | | | | |
| | | | 2372 | | | | | |
| | | | 2402 | | | | | |
| | | | | 2573 | | | | |
| | | | | 2603 | | | | |
| | | | | | 2774 | | | |
| | | | | | 3004 | | | |
| | | | | | | 3175 | | |
| | | | | | | 3205 | | |
| | | | | | | | 3376 | |
| | | | | | | | 3406 | |
| | | | | | | | | 3577 |
| | | | | | | | | 3607 |
| | 3770 | 3771 | 3772 | 3773 | 3774 | 3775 | 3776 | 3777 |

FIG. 7

| READING SEQUENCE | | ADDRESS (OCTAL) | SAMPLING & WRITING SEQUENCE | | ADDRESS (OCTAL) |
|---|---|---|---|---|---|
| INPUT | SAMPLE | | INPUT | SAMPLE | |
| 1 | 1 | 0 | 1 | 1 | 0 |
| 1 | 2 | 10 | | | |
| 1 | 3 | 20 | 2 | 1 | 1 |
| 1 | 4 | 30 | | | |
| 1 | 5 | 40 | 3 | 1 | 2 |
| 1 | 6 | 50 | . | . | . |
| . | . | . | . | . | . |
| 1 | 15 | 160 | 8 | 1 | 7 |
| 1 | 16 | 170 | | | |
| 1 | 17 | 200 | 1 | 2 | 10 |
| 1 | 18 | 210 | . | . | . |
| . | . | . | . | . | . |
| 1 | 31 | 360 | 8 | 2 | 17 |
| 1 | 32 | 370 | | | |
| . | . | . | . | . | . |
| 1 | 255 | 3760 | | | |
| 1 | 256 | 3770 | 8 | 16 | 177 |
| 2 | 17 | 201 | 1 | 17 | 200 |
| 2 | 18 | 211 | . | . | . |
| . | . | . | | | |
| 2 | 255 | 3761 | | | |
| 2 | 256 | 3771 | | | |
| 2 | 257 (1) | 1 | | | |
| 2 | 258 (2) | 11 | | | |
| . | . | . | | | |
| 2 | 271 (15) | 161 | | | |
| 2 | 272 (16) | 171 | 8 | 32 | 377 |
| 3 | 33 | 402 | 1 | 33 | 400 |
| 3 | 34 | 412 | . | . | . |
| . | . | . | | | |
| 3 | 255 | 3762 | | | |
| 3 | 256 | 3772 | | | |
| 3 | 257 (1) | 2 | | | |
| 3 | 258 (2) | 12 | | | |
| . | . | . | | | |
| 3 | 287 (31) | 362 | | | |
| 3 | 288 (32) | 372 | 8 | 48 | 577 |
| 4 | 49 | 603 | 1 | 49 | 600 |
| 4 | 50 | 613 | . | . | . |
| . | . | . | | | |
| 4 | 255 | 3763 | | | |
| 4 | 256 | 3773 | | | |
| 4 | 257 (1) | 3 | | | |
| 4 | 258 (2) | 13 | | | |
| . | . | . | | | |
| 4 | 303 (47) | 563 | | | |
| 4 | 304 (48) | 573 | 8 | 64 | 777 |

*FIG. 8* (PART 1)

| READING SEQUENCE | | ADDRESS (OCTAL) | SAMPLING & WRITING SEQUENCE | | ADDRESS (OCTAL) |
|---|---|---|---|---|---|
| INPUT | SAMPLE | | INPUT | SAMPLE | |
| 5 | 65 | 1004 | 1 | 65 | 1000 |
| 5 | 66 | 1014 | . | . | . |
| . | . | . | . | . | . |
| 5 | 255 | 3764 | . | . | . |
| 5 | 256 | 3774 | . | . | . |
| 5 | 257 (1) | 4 | . | . | . |
| 5 | 258 (2) | 14 | . | . | . |
| . | . | . | . | . | . |
| 5 | 319 (63) | 764 | . | . | . |
| 5 | 320 (64) | 774 | 8 | 80 | 1177 |
| 6 | 81 | 1205 | 1 | 81 | 1200 |
| 6 | 82 | 1215 | . | . | . |
| . | . | . | . | . | . |
| 6 | 255 | 3765 | . | . | . |
| 6 | 256 | 3775 | . | . | . |
| 6 | 257 (1) | 5 | . | . | . |
| 6 | 258 (2) | 15 | . | . | . |
| . | . | . | . | . | . |
| 6 | 335 (79) | 1165 | . | . | . |
| 6 | 336 (80) | 1175 | 8 | 96 | 1377 |
| 7 | 97 | 1406 | 1 | 97 | 1400 |
| 7 | 98 | 1416 | . | . | . |
| . | . | . | . | . | . |
| 7 | 255 | 3766 | . | . | . |
| 7 | 256 | 3776 | . | . | . |
| 7 | 257 (1) | 6 | . | . | . |
| 7 | 258 (2) | 16 | . | . | . |
| . | . | . | . | . | . |
| 7 | 351 (95) | 1366 | . | . | . |
| 7 | 352 (96) | 1376 | 8 | 112 | 1577 |
| 8 | 113 | 1607 | 1 | 113 | 1600 |
| 8 | 114 | 1617 | . | . | . |
| . | . | . | . | . | . |
| 8 | 255 | 3767 | . | . | . |
| 8 | 256 | 3777 | . | . | . |
| 8 | 257 (1) | 7 | . | . | . |
| 8 | 258 (2) | 17 | . | . | . |
| . | . | . | . | . | . |
| 8 | 367 (111) | 1567 | . | . | . |
| 8 | 368 (112) | 1577 | 8 | 128 | 1777 |
| 1 | 129 | 2000 | 1 | 129 | 2000 |
| 1 | 130 | 2010 | . | . | . |
| . | . | . | . | . | . |
| 1 | 255 | 3760 | . | . | . |
| 1 | 256 | 3770 | . | . | . |
| 1 | 257 (1) | 0 | . | . | . |
| 1 | 258 (2) | 10 | . | . | . |
| . | . | . | . | . | . |
| 1 | 383 (127) | 1760 | . | . | . |
| 1 | 384 (128) | 1770 | 8 | 144 | 2177 |

*FIG. 8* (PART 2)

| READING SEQUENCE | | ADDRESS (OCTAL) | SAMPLING & WRITING SEQUENCE | | ADDRESS (OCTAL) |
|---|---|---|---|---|---|
| INPUT | SAMPLE | | INPUT | SAMPLE | |
| 2 | 145 | 2201 | 1 | 145 | 2200 |
| 2 | 146 | 2211 | . | . | . |
| . | . | . | . | . | . |
| 2 | 255 | 3761 | . | . | . |
| 2 | 256 | 3771 | . | . | . |
| 2 | 257 (1) | 1 | . | . | . |
| 2 | 258 (2) | 11 | . | . | . |
| . | . | . | . | . | . |
| 2 | 399 (143) | 2161 | | | |
| 2 | 400 (144) | 2171 | 8 | 160 | 2377 |
| 3 | 161 | 2402 | 1 | 161 | 2400 |
| 3 | 162 | 2412 | . | . | . |
| . | . | . | . | . | . |
| 3 | 255 | 3762 | . | . | . |
| 3 | 256 | 3772 | . | . | . |
| 3 | 257 (1) | 2 | . | . | . |
| 3 | 258 (2) | 12 | . | . | . |
| . | . | . | . | . | . |
| 3 | 415 (159) | 2362 | | | |
| 3 | 416 (160) | 2372 | 8 | 176 | 2577 |
| 4 | 177 | 2603 | 1 | 177 | 2600 |
| 4 | 178 | 2613 | . | . | . |
| . | . | . | . | . | . |
| 4 | 255 | 3763 | . | . | . |
| 4 | 256 | 3773 | . | . | . |
| 4 | 257 (1) | 3 | . | . | . |
| 4 | 258 (2) | 13 | . | . | . |
| . | . | . | . | . | . |
| 4 | 431 (175) | 2563 | | | |
| 4 | 432 (176) | 2573 | 8 | 192 | 2777 |
| 5 | 193 | 3004 | 1 | 193 | 3000 |
| 5 | 194 | 3014 | . | . | . |
| . | . | . | . | . | . |
| 5 | 255 | 3764 | . | . | . |
| 5 | 256 | 3774 | . | . | . |
| 5 | 257 (1) | 4 | . | . | . |
| 5 | 258 (2) | 14 | . | . | . |
| . | . | . | . | . | . |
| 5 | 447 (191) | 2764 | | | |
| 5 | 448 (192) | 2774 | 8 | 208 | 3177 |
| 6 | 209 | 3205 | 1 | 209 | 3200 |
| 6 | 210 | 3215 | . | . | . |
| . | . | . | . | . | . |
| 6 | 255 | 3765 | . | . | . |
| 6 | 256 | 3775 | . | . | . |
| 6 | 257 (1) | 5 | . | . | . |
| 6 | 258 (2) | 15 | . | . | . |
| . | . | . | . | . | . |
| 6 | 463 (207) | 3165 | | | |
| 6 | 464 (208) | 3175 | 8 | 224 | 3377 |

*FIG. 8* (PART 3)

| READING SEQUENCE | | ADDRESS (OCTAL) | SAMPLING & WRITING SEQUENCE | | ADDRESS (OCTAL) |
| --- | --- | --- | --- | --- | --- |
| INPUT | SAMPLE | | INPUT | SAMPLE | |
| 7 | 225 | 3406 | 1 | 225 | 3400 |
| 7 | 226 | 3416 | . | . | . |
| . | . | . | . | . | . |
| 7 | 255 | 3766 | . | . | . |
| 7 | 256 | 3776 | . | . | . |
| 7 | 257 (1) | 6 | . | . | . |
| 7 | 258 (2) | 16 | . | . | . |
| . | . | . | . | . | . |
| 7 | 479 (223) | 3366 | | | |
| 7 | 480 (224) | 3376 | 8 | 240 | 3577 |
| 8 | 241 | 3607 | 1 | 241 | 3600 |
| 8 | 242 | 3617 | . | . | . |
| . | . | . | . | . | . |
| 8 | 255 | 3767 | . | . | . |
| 8 | 256 | 3777 | . | . | . |
| 8 | 257 (1) | 7 | . | . | . |
| 8 | 258 (2) | 17 | . | . | . |
| . | . | . | . | . | . |
| 8 | 495 (239) | 3567 | | | |
| 8 | 496 (240) | 3577 | 8 | 256 | 3777 |

*FIG. 8* (PART 4)

TIME COMPRESSION RECEIVER

BACKGROUND OF THE INVENTION

This invention relates to apparatus for receiving and detecting the presence of analog signals on a plurality of input lines. More particularly, it is concerned with receivers for detecting signalling tones on telephone lines.

In a telephone exchange incoming lines may be connected to a receiver which receives signalling tones on the lines, detects the particular tones present, and supplies the tone information in a digital format to control circuitry. Typically, the signalling tones may be of either the well-known MF (multifrequency) or DTMF (dual tone multi-frequency) format. In a system employing the DTMF format the incoming signals are applied to a pair of band reject filters which separate high frequency tones from low frequency tones. The outputs of the band reject filters are applied to comparator and limiter circuitry. The resulting signals are applied to banks of tone filters each of which passes one of the frequency tones used in the system. The output of each tone filter is connected to a level detector which is set by a signal passing through its associated tone filter to produce a signal indicating that a particular tone is present on the incoming line.

In an exchange as described briefly hereinabove, a complete receiver is required for each incoming line on which signalling tones are being received. Thus, the space requirement, weight, and cost increases proportionally with the number of receivers in the exchange.

SUMMARY OF THE INVENTION

Time compression receiving apparatus in accordance with the present invention provides for receiving and detecting signals on several incoming lines while considerably reducing the filtering and detection circuitry required. The apparatus detects the presence of signals of predetermined frequencies on any of a plurality of receiver input lines. The apparatus includes a multiplexing means which repeatedly samples the receiver input lines in order and produces analog samples of input signals present on the receiver input lines at its output connection. An analog-to-digital converting means is coupled to the output connection of the multiplexing means and converts each of the analog samples to a digital sample. The digital samples are stored in a memory means. A memory readout means reads the digital samples associated with each of the receiver input lines out of the memory means. All of the samples associated with a receiver input line are read out for each receiver input line in turn. The digital samples associated with a receiver input line are read out in the same order as the analog samples associated with that receiver input line were produced by the multiplexing means.

A digital-to-analog converting means which is coupled to the memory means converts each digital sample to an analog pulse. The analog pulses associated with a receiver input line are converted to an analog signal by a filter means. The signal frequencies present in an analog signal are equal to those predetermined frequencies present in the associated input signal times an integral multiple of the number of receiver input lines. A detecting means determines the presence or absence of each of the signal frequencies in the analog signal and produces an indication thereof, thereby indicating the presence or absence of each of the predetermined frequencies in the associated input signal. The apparatus also includes receiver identifying means for producing receiver identifying signals which designate the particular receiver input line with which the indications are associated.

BRIEF DESCRIPTION OF THE DRAWINGS

Additional objects, features, and advantages of receiver apparatus in accordance with the present invention will be apparent from the following detailed discussion together with the accompanying drawings wherein:

FIGS. 6A and 6B are timing diagrams of signals generated within the receiver for controlling its operation;

FIG. 7 is a chart illustrating the organization of the memory; and

FIG. 8 is a table which is useful in explaining the sequence of operations of the receiver.

DETAILED DESCRIPTION OF THE INVENTION

General

Figure 1:
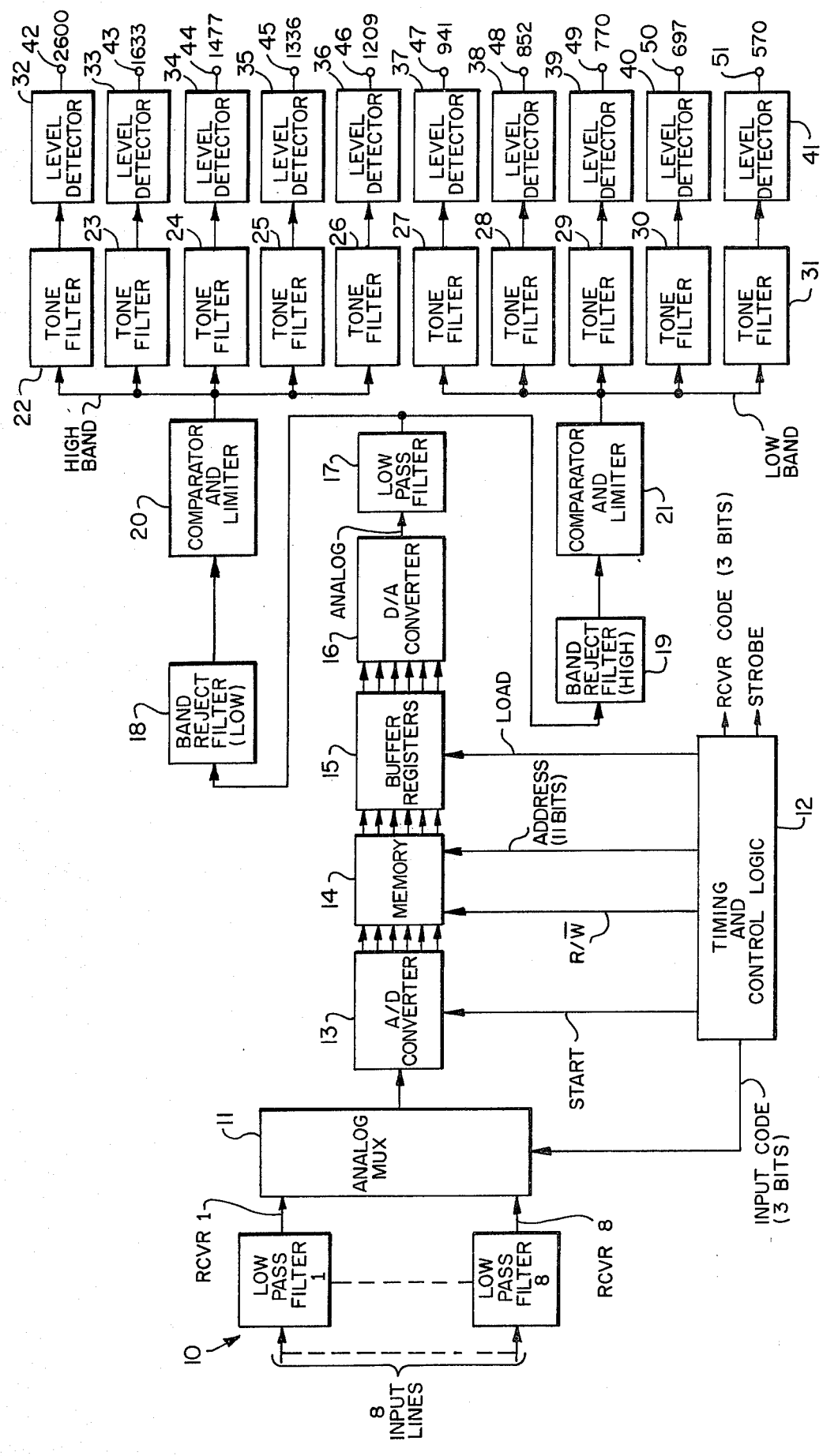
FIG. 1 is a block diagram of a time compression receiver in accordance with the present invention.

A time compression receiver in accordance with the present invention is illustrated in the block diagram of FIG. 1. For purposes of discussion a specific embodiment having particular parameters is described herein. In the particular specific embodiment under discussion a DTMF signal format is employed and the signalling tones are five low frequency tones of 570 Hz, 697 Hz, 770 Hz, 852 Hz, and 941 Hz, and five high frequency tones of 1209 Hz, 1336 Hz, 1477 Hz, 1633 Hz, and 2600 Hz.

The receiver as illustrated in FIG. 1 services eight incoming lines at a time. The incoming lines are each connected to one of eight low pass filters 1–8, 10. The output signals from the low pass filters 1–8 labeled RCVR 1 – RCVR 8 are applied in parallel to the 8-input analog multiplexer 11. The multiplexer 11 operates under control of INPUT CODE signals from the timing and control logic 12 to repeatedly sample each of the input signals in order.

Each analog sample from the multiplexer 11 is converted to a 6-bit digital sample by an analog-to-digital converter 13. The analog-to-digital converter 13 is controlled by a START signal from the timing and control logic 12. Under control of R/$\overline{W}$ and ADDRESS signals from the timing and control logic 12 the 6-bit samples are entered in a random access memory 14. By virtue of the sampling sequence of the multiplexer 11 the order in which the samples associated with the receiver input lines are entered into the memory is the first sample from each of the eight input lines in order, then the second sample from each input line in order, and so on. The capacity of the memory 14 is 256 6-bit samples for each of the eight input lines. That is, a total of 2048 samples are taken and stored in the memory during a memory input period.

The digital samples associated with each receiver input line are read out of the memory 14 under the control of the R/W, ADDRESS, and LOAD signals from the timing and control logic 12. All the samples associated with an input line are read out for each input line in turn. The 256 samples associated with a receiver input line are read out during a line readout period with the oldest sample associated with that input line being read out first. In the particular specific embodiment under discussion the digital samples are read out at twice the rate the samples are entered. Thus, as will be explained hereinbelow, within a single memory input period, for each receiver input line two sets of 256 samples are read out during separate line readout periods with a 50% overlap of the digital samples read out. Since data on each receiver input line is presented twice, this arrangement provides the opportunity for checking the continued existence of the signals over a period of time in order to verify that the tones as indicated are really present and that noise is not producing the response.

Each 6-bit sample read out of the memory 14 is entered in a buffer register 15 and is applied to a digital-to-analog converter 16. The digital-to-analog converter converts each digital sample to an analog pulse. The analog pulses are applied to a low pass filter 17 to produce a smooth, continuous analog signal. By virtue of the time compression provided by the apparatus, the frequencies present in the analog signal from the filter 17 are 16 times the tone frequencies present on the input line with which the analog signal is associated.

The analog signal from the low pass filter 17 is applied to band reject filters 18 and 19. If one of the five high frequencies is present, it passes through the low band reject filter 18 to the comparator and limiter 20. If one of the five low frequencies is present, it passes through the high band reject filter 19 to the comparator and limiter 21. The comparators ensure that only a signal having a predetermined threshold is accepted, and the limiters fix the amplitude of the signals.

Signals from the comparator and limiter 20 are applied to tone filters 22, 23, 24, 25, and 26. The comparator and limiter 21 is connected to tone filters 27, 28, 29, 30, and 31. Each of the tone filters passes only a single frequency which is 16 times one of the 10 signalling tones. The high bandpass filters 22, 23, 24, 25, and 26 pass 41,600 HZ, 26,128 Hz, 23,632 Hz, 21,376 Hz, and 19,334 Hz, respectively. The low bandpass filters 27, 28, 29, 30, and 31 pass 15,056 Hz, 13,632 Hz, 12,320 Hz, 11,152 Hz, 9,120 Hz, respectively.

The outputs of the tone filters 22, 23, 24, 25, and 26 are applied to level detectors 32, 33, 34, 35, and 36, respectively. The outputs of the tone filters 27, 28, 29, 30, and 31 are applied to level detectors 37, 38, 39, 40, and 41, respectively. In response to a frequency of suitable amplitude being applied thereto a level detector produces a steady state output signal at its output terminal. The presence of an output signal from one of level detectors 32, 33, 34, 35, or 36 at output terminal 42, 43, 44, 45, or 46 indicates the presence of a tone of 2600 Hz, 1633 Hz, 1477 Hz, 1536 Hz, or 1209 Hz, respectively, on the associated input line. Similarly, the presence of an output signal from one of level detectors 37, 38, 39, 40, or 41 at output terminal 47, 48, 49, 50, or 51 indicates the presence of a tone of 941 Hz, 852 Hz, 770 Hz, 697 Hz, or 570 Hz, respectively, on the associated input line.

The timing and control logic 12 produces receiver input line identifying signals labeled RCVR CODE for identifying the particular input line with which the output signals at the output terminals 42–46 and 47–51 are associated. A STROBE signal is also produced by the timing and control logic 12 for each set of data associated with a RCVR CODE signal at a time subsequent to any possible delays in propagating data through the apparatus to the output terminals.

Timing and Control Logic

Figure 2:
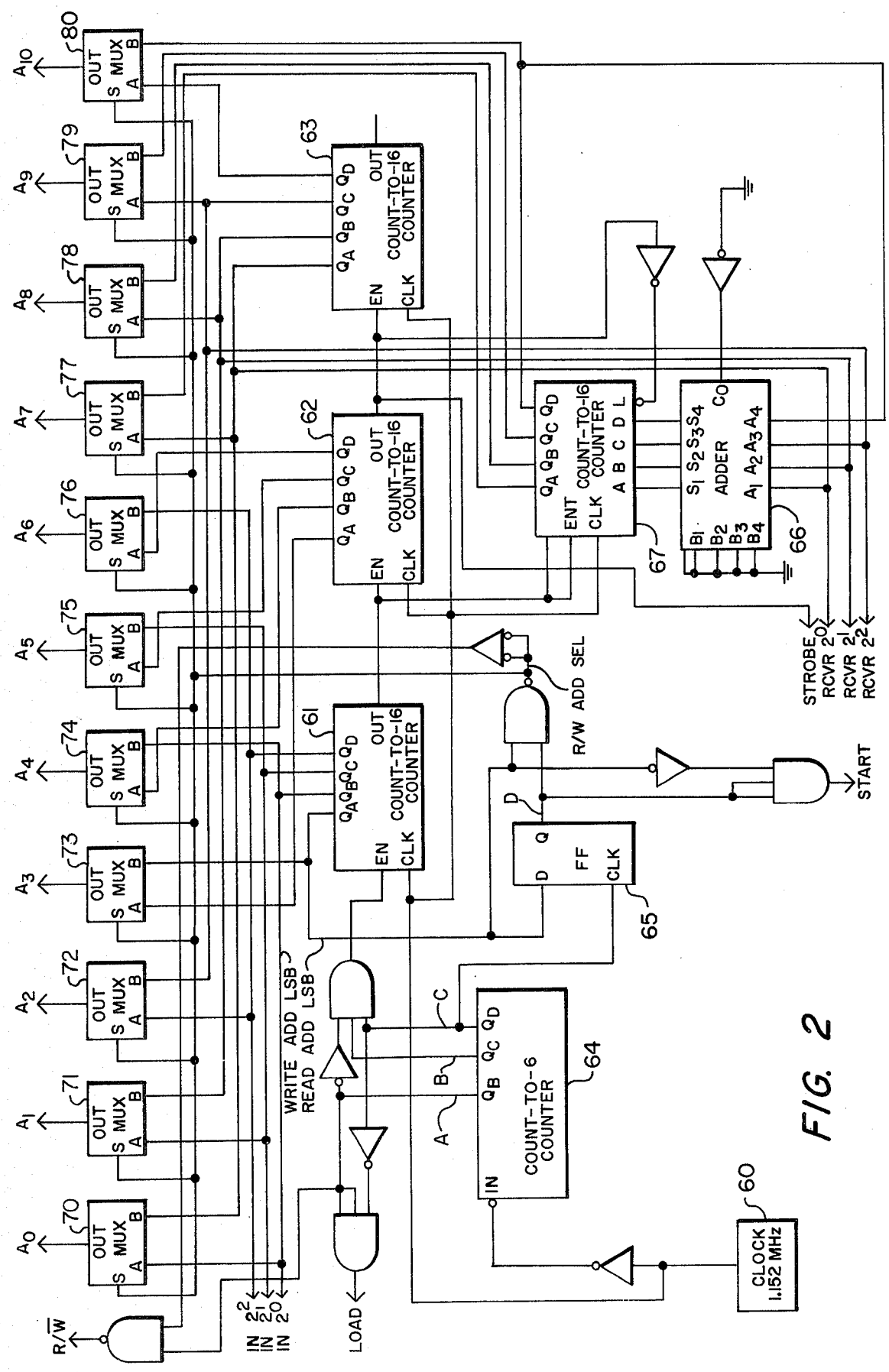
FIG. 2 is a logic diagram of the timing and control logic of the receiver of FIG. 1.

The timing and control logic section of the receiver is illustrated in the logic diagram of FIG. 2. Standard well-known symbols and notations are employed to designate various logic components. The timing and control signals for controlling the operation of the receiver are generated by the timing and control logic section. Certain of the signals produced by the timing and control logic are shown in the timing diagrams of FIGS. 6A and 6B.

A timing train starts from a master oscillator 60 which produces squarewave clock pulses at the rate of 1.152 MHz. The squarewave pulses are applied to a series of counters including a count-to-6 counter 64, a first count-to-16 counter 61, a second count-to-16 counter 62, and a third count-to-16 counter 63. Outputs from the four stages of the third count-to-16 counter 63 are loaded into a fourth count-to-16 counter 67 by way of an adder 66. The adder 66 is connected to add a count of one so that counter 67 contains a count which is greater by one than the count in counter 63. Outputs from the last stage of the count-to-6 counter 64 and the first stage of the count-to-16 counter 61 are applied to flip-flop 65.

Outputs labeled A, B, and C (as shown in FIG. 6A) are taken from stages in the count-to-6 counter 64 and applied to the first count-to-16 counter 61 as shown in FIG. 2. The A and C outputs are combined through logic components to produce the LOAD signal (FIG. 6A) for loading data from the memory into the buffer registers 15. The output labeled D from the flip-flop 65 is combined with the output of the first stage of the first count-to-16 counter 61 to produce the START signal (FIG. 6A) to the analog-to-digital converter 13. These same two signals are also combined by suitable logic to produce the R/W ADD SEL signal (FIG. 6A) for use in controlling the memory address as will be explained hereinbelow. The R/W ADD SEL signal is combined with the A output from the count-to-6 counter 64 to produce the R/W signal (FIG. 6A) to the memory 14.

Signals labeled IN $2^0$, IN $2^1$, and IN $2^2$ (IN $2^0$ is shown in FIG. 6A) are taken from the first count-to-16 counter 61 and applied as the INPUT CODE to the analog multiplexer 11. These signals establish the basic rate at which the receiver input lines are sampled to provide a data sampling period of 10.4 microseconds.

Figure 6B:
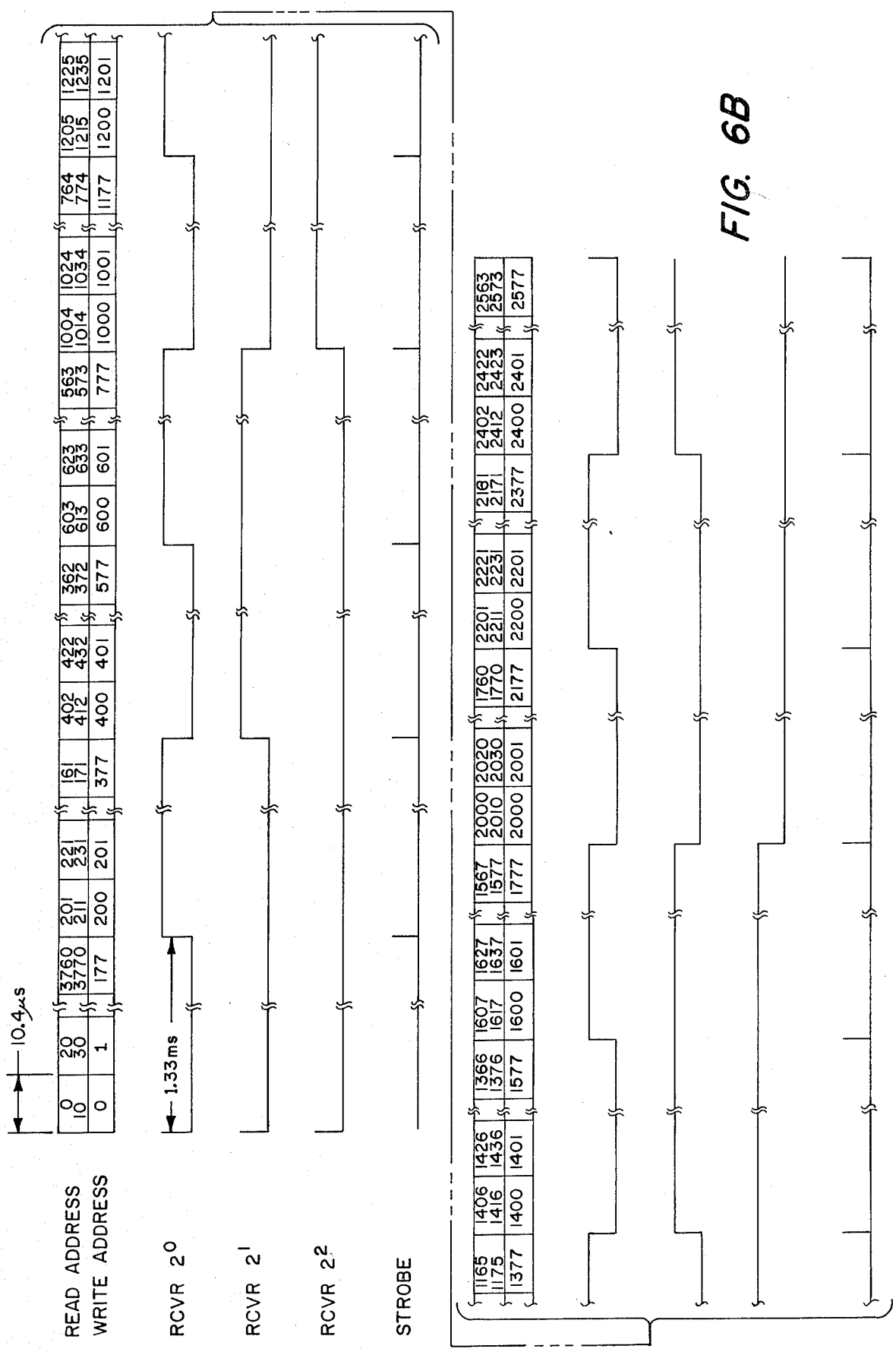

Outputs from the third count-to-16 counter 63 produce the RCVR $2^0$, RCVR $2^1$, and RCVR $2^2$ signals of the RCVR CODE (FIG. 6B). These signals identify the particular receiver input line associated with the data being presented at the outputs 42–51 (FIG. 1). The STROBE signal (FIG. 6B) is produced by the second count-to-16 counter 62. As shown in FIG. 6B the RCVR CODE and STROBE signals establish a 1.33 millisecond period, designated a line readout period, during which data associated with a single receiver input line is read out of the memory.

ADDRESS signals $A_0$ –$A_{10}$ for addressing the storage locations of the memory are produced by an arrangement of 11 address multiplexers 70–80. The stages of the four count-to-16 counters 61, 62, 63, and 67 are connected to the inputs of the multiplexers. The "A"

inputs to the multiplexers contain writing address information and the "B" inputs contain readout address information. The A and B inputs are multiplexed at the outputs by the R/W ADD SEL signal applied to the control inputs. The particular pattern of connections between the outputs of the count-to-16 counters and A and B inputs of the address multiplexers is such as to provide the proper sequence for writing in and reading out data from the memory as will be explained hereinbelow.

Sampling and Digitizing

As shown in FIG. 1 the eight input lines are each connected to a low pass filter 1–8, 10. The low pass filters 1–8 may be any of various types of well-known filters either active or passive. Preferably, in order to save weight and space active filters may be employed. The low pass filters 1–8 reduce high frequency noise which might combine with the sampling rate at which the analog multiplexer 11 operates to produce frequencies at the same frequency as a signal tone.

Figure 3:
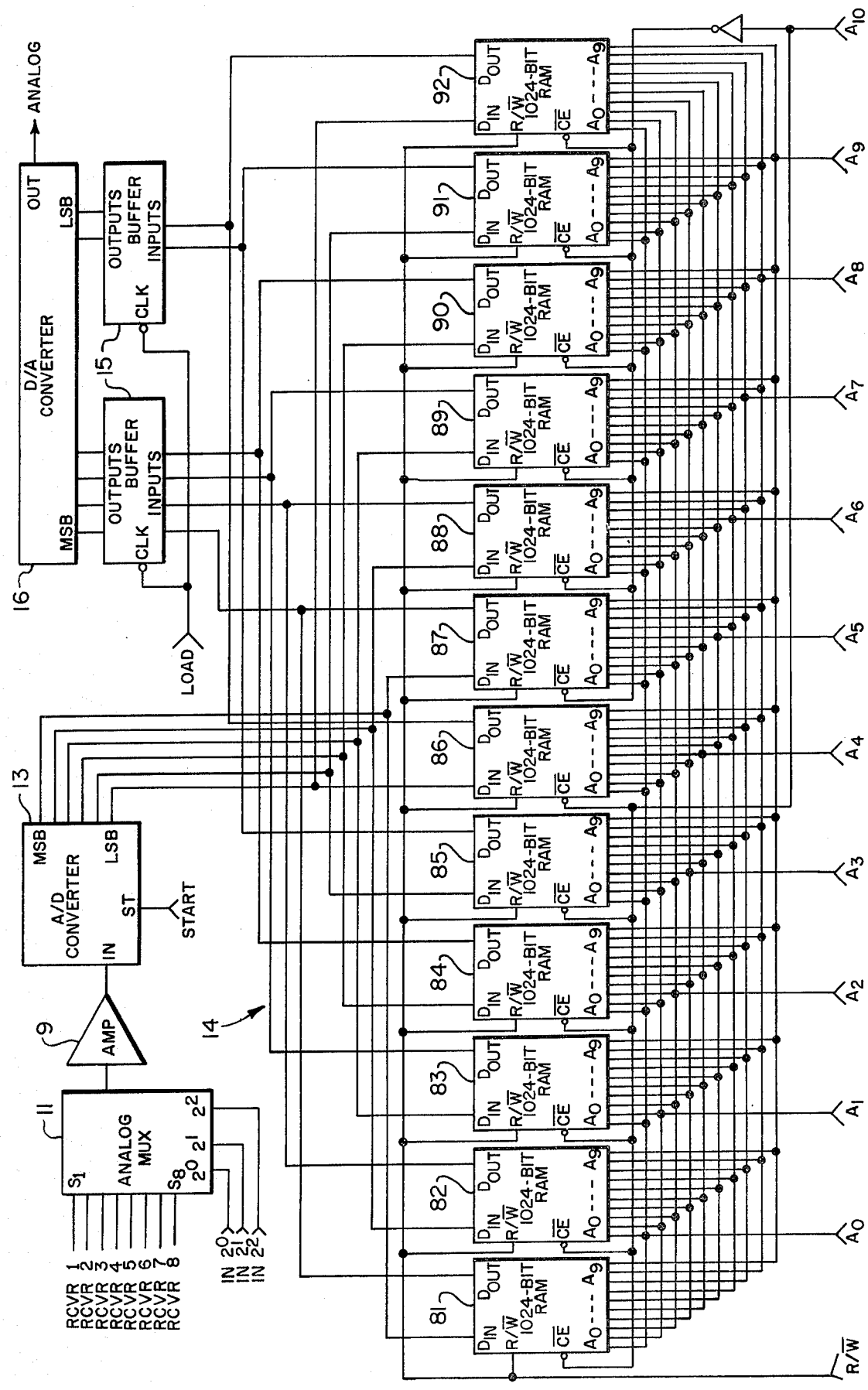
FIG. 3 is a logic diagram of a section of the receiver including a multiplexer, an analog-to-digital converter, a memory, and a digital-to-analog converter.

The tones on the input lines pass through the low pass filters 1–8 and are applied as signals RCVR 1 – RCVR 8 to the 8-input analog multiplexer 11 as shown in FIG. 3. The multiplexer 11 is stepped through its eight input terminals by signals IN $2^0$, IN $2^1$, and IN $2^2$ from the timing section. (The IN $2^0$ signal is shown in FIG. 6A.) An analog sample is thus taken every 10.4 microseconds, and the signal on each receiver input line is sampled every 83.3 microseconds. Thus, a total of 256 analog samples are taken of each of the eight input signals RCVR 1 – RCVR 8 over a memory input period of 21.3 milliseconds.

Every 10.4 microsecond period the multiplexer 11 applies an analog sample to the analog-to-digital converter 13 through amplifier 9. The analog-to-digital converter 13 is activated by a START signal from the timing section as shown in FIG. 6A. The analog-to-digital converter 13 converts each analog sample to a digital sample of six bits. The six bits are presented in parallel at its outputs.

Memory and Memory Addressing

The memory 14 as shown in FIG. 3 employs an arrangement of twelve random access memories (RAMS) 81–92 for storing the six bits of each digital sample received from the analog-to-digital converter 13. Each RAM has storage locations for 1024 bits, and thus has 10 address inputs $A_0 - A_9$ for selecting each of the 1024 bit storage locations. In addition, each RAM has an enabling input labeled $\overline{CE}$. The $A_0 - A_9$ address signals from the address multiplexers 70–79 of the timing and control logic are connected in parallel to the $A_0 - A_9$ address inputs of each RAM. The $A_{10}$ address signal (the most significant bit) is applied directly to the $\overline{CE}$ input of six of the RAMS 81–85 and through an inverter to the $\overline{CE}$ input of the other six RAMS 86–92. In effect this arrangement provides a memory having 2048 sets of storage locations, each set of storage locations being capable of storing a 6-bit digital sample and being addressed by address signals $A_0 - A_{10}$. For purposes of discussion herein, the memory is considered organized as a matrix of 8 by 256 sets of storage locations with the addresses to the sets of storage locations expressed as octal base numbers. A chart of this memory arrangement is shown in FIG. 7.

The RAMS are enabled to write in or read out data by the R/W signal from the timing section. The R/W signal as shown in FIG. 6A is repeated every 10.4 microsecond data sampling period with the "write" instruction occurring for a short portion of the period immediately prior to the end of the period. Although the "read" instruction occurs during the remainder of each 10.4 microsecond period, data is not read out and loaded into the buffer 15 except during two pulses of the LOAD signal (FIG. 6A) during earlier portions of each 10.4 microsecond period. The LOAD pulses cause the buffer 15 to accept the data presented at its inputs from the outputs of the RAMS.

The sequence in which data is written into and read out of the memory is shown in detail by the table of FIG. 8. As shown by the column labeled "Sampling and Writing Sequence" samples are obtained by sampling each of the eight receiver input lines in order repeatedly. Each sample is entered in the memory during the same 10.4 microsecond data sampling period it was produced. As indicated by the addresses for the Sampling and Writing Sequence the samples are written into the memory in order by rows as illustrated in the chart of FIG. 7. The WRITE ADDRESS sequence is also indicated in the timing diagram of FIG. 6B. Each column of the memory as shown by the chart of FIG. 7 contains samples associated with a single one of the eight input lines. As stated previously the memory has a capacity of 256 samples for each of the eight input lines, a total of 2048 samples. The data in the memory is completely replaced every memory input period of 21.3 milliseconds.

As shown by the column labeled Reading Sequence in FIG. 8 data is read out of the memory in different order. Samples associated with input line 1 are read out first, followed by samples associated with input line 2, and so on in order by lines. The samples are read out by reading down the columns shown in the chart of FIG. 7. The data is read out at twice the input rate, that is two samples are read out during each 10.4 microsecond data sampling period.

The data for each receiver input line is read out of the memory in order starting with the oldest sample. That is, during the first line readout period of a memory input period input line 1 data is read out starting with the 0 address. A sample is read out every 5.2 microseconds by addressing every eighth address in order during subsequent LOAD signal pulses. The sequences of addresses are shown in the Reading Sequence addressed of FIG. 8, the input 1 column of FIG. 7, and the READ ADDRESS of FIG. 6B. The 256 samples associated with input 1 are read out in a line readout period of 1.33 milliseconds.

As can be seen from FIGS. 6B and 8 by the end of the first line readout period new data has been entered in addresses 0 through 177. Thus upon completion of the first line readout period the oldest sample of input 2 data (designated sample 17) is stored at address 201. Therefore, during the line readout period for input 2 data as shown under Reading Sequence in FIG. 8, 256 samples are read out starting at address 201 and proceeding to address 3771 and then from address 1 through 171.

The writing in and reading out of data proceeds in a similar manner as indicated in FIGS. 6B, 7, and 8 for eight line readout periods or one-half of a memory input period. At this time the $256^{th}$ sample of input 8 data has been read out at address 1577 and the $128^{th}$ sample of new input 8 data has been written in at address 1777. That is, while all the memory storage locations have been addressed for reading out data, only half the storage locations have been addressed for writing in new data.

During the next half of the memory input period, data continues to be entered into the memory in the same manner as previously from address 2000 to address 3777. During the second half of the memory input period the entire memory is read out during eight line readout periods. However, since the oldest sample of input 1 data is now located at the 2000 address, that location is addressed first. During the line readout period 256 samples are read out, from addresses 2000 to 3700 and then from addresses 0 to 1770.

During the second line readout period of the second half of the memory input period the input 2 data is read out starting with the samples stored at address 2201, the oldest stored sample of input 2 data at that time. Operation continues in this manner as shown in FIGS. 6B, 7, and 8 until the 256$^{th}$ sample of input 8 data is written in at address 3577.

As can be seen data for each input line is read out twice during a memory input period, and there is an overlap of 50% of the data during each line readout period.

The proper address information $A_0 - A_{10}$ is provided to the RAMS during the positive pulses of the LOAD signal (FIG. 6A) to read out samples and during the negative-going pulses of the R/$\overline{W}$ signal (FIG. 6A) to write in samples by the timing and control logic of FIG. 2 as explained hereinabove. The outputs of the stages of counters are connected in order to the A inputs of the address multiplexers 70-80. The WRITE ADD LSB signal (FIG. 6A) which determines the basic 10.4 microsecond data sampling rate is applied to the A input of the first address multiplexer 70.

Since the readout addresses are in order by eights, the connections from the outputs of the counter stages to the B inputs of the address multiplexers are somewhat different. The READ ADD LSB signal (FIG. 6A) which establishes the basic 5.2 microsecond data readout period is applied to the B input of the fourth address multiplexer 73 thus establishing a count-by-8 sequence. The first three address multiplexers 70-72 determine the last digit of the address and, therefore, the signals at their B input change only upon completion of each line readout period.

The outputs of the address multiplexers 70-80 are connected to the proper inputs A or B at the proper time during the LOAD and R/$\overline{W}$ signals by the R/W ADD SEL signal (FIG. 6A). As can be seen, during each 10.4 microsecond data sampling period three different combinations of address signals $A_0 - A_{10}$ are produced by the address multiplexers 70-80; two readout addresses and one write in address.

Digital-to-Analog Conversion and Analog Processing

During each 5.2 microsecond data readout period the six bits of a digital sample are read out in parallel from the memory 14 and placed in the buffer 15 under control of the LOAD signal. The outputs of the buffer 15 are connected to a digital-to-analog converter 16 which converts the six bits of each digital sample to an analog voltage. During a line readout period of 1.33 milliseconds the 256 samples associated with a single receiver input line appear as a series of 256 analog voltage pulses at the output of the digital-to-analog converter 16. These 256 pulses are produced from samples which were obtained by the 8-input multiplexer 11 over a period of 21.3 milliseconds. Thus, the pulses in the ANALOG signal from the digital-to-analog converter 16 have been speeded up, or time compressed, by a factor of 16.

Figure 4:
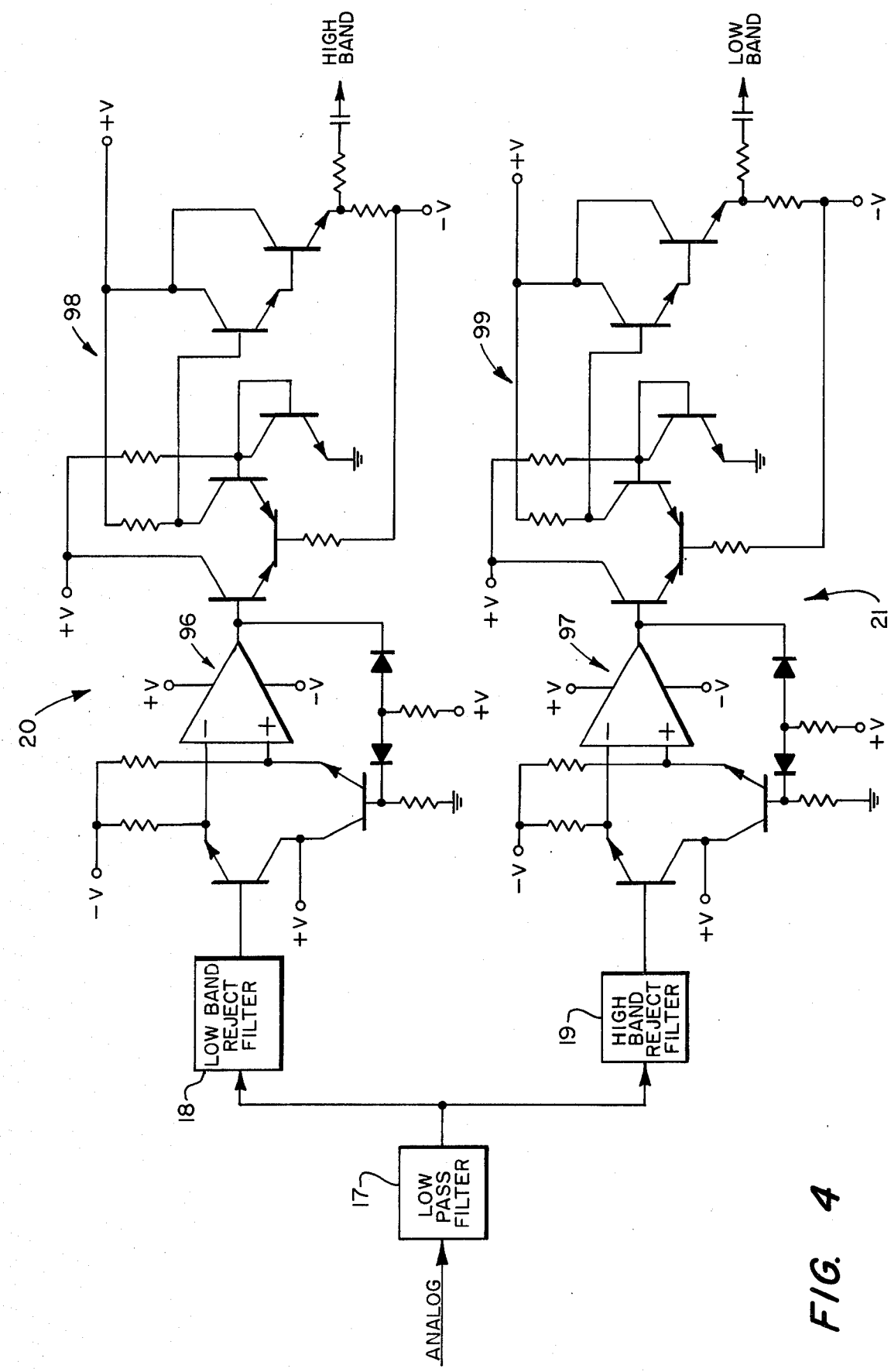
FIGS. 4 and 5 are diagrams of the filtering and detection sections of the receiver.

The voltage pulses of the ANALOG signal are applied to a low pass filter 17 as illustrated in FIG. 4. The low pass filter 17 eliminates the steps between pulses of the ANALOG signal and also reduces sum and difference frequencies generated during the sampling procedure. Thus, during each 1.33 millisecond line readout period the output of the low pass filter 17 is a smooth, continuous curve of signal frequencies sixteen times the frequencies present in the input signal from which it was derived.

The output signals of the low pass filter 17 are applied to a low band reject filter 18 and a high band reject filter 19 in parallel. As memtioned previously, in the system under discussion signal tones of 1209 Hz, 1336 Hz, 1477 Hz, 1633 Hz, and 2600 Hz are designated high band and signal tones of 570 Hz, 697 Hz, 770 Hz, 852 Hz, and 941 Hz are designated low band. Since the incoming frequencies have been multiplied by a factor of 16, the low band reject filter 18 rejects frequencies of 15,056 Hz (941 × 16) and below. The high band reject filter 19 rejects frequencies of 19,344 Hz (1209 × 16) and above.

The signals passing through the band reject filters 18 and 19 are applied to comparators 96 and 97 of the comparator and limiter arrangements 20 and 21, respectively. The comparators 96 and 97 pass only signals from the band reject filters which exceed a predetermined threshold level. Thus, the incoming signals must be of greater amplitude than a certain minimum level in order to be acceptable. The limiters 98 and 99 are differential amplifier circuits which amplify the outputs of the comparators 96 and 97, respectively, to produce square waves having a fixed peak-to-peak level.

Figure 5:
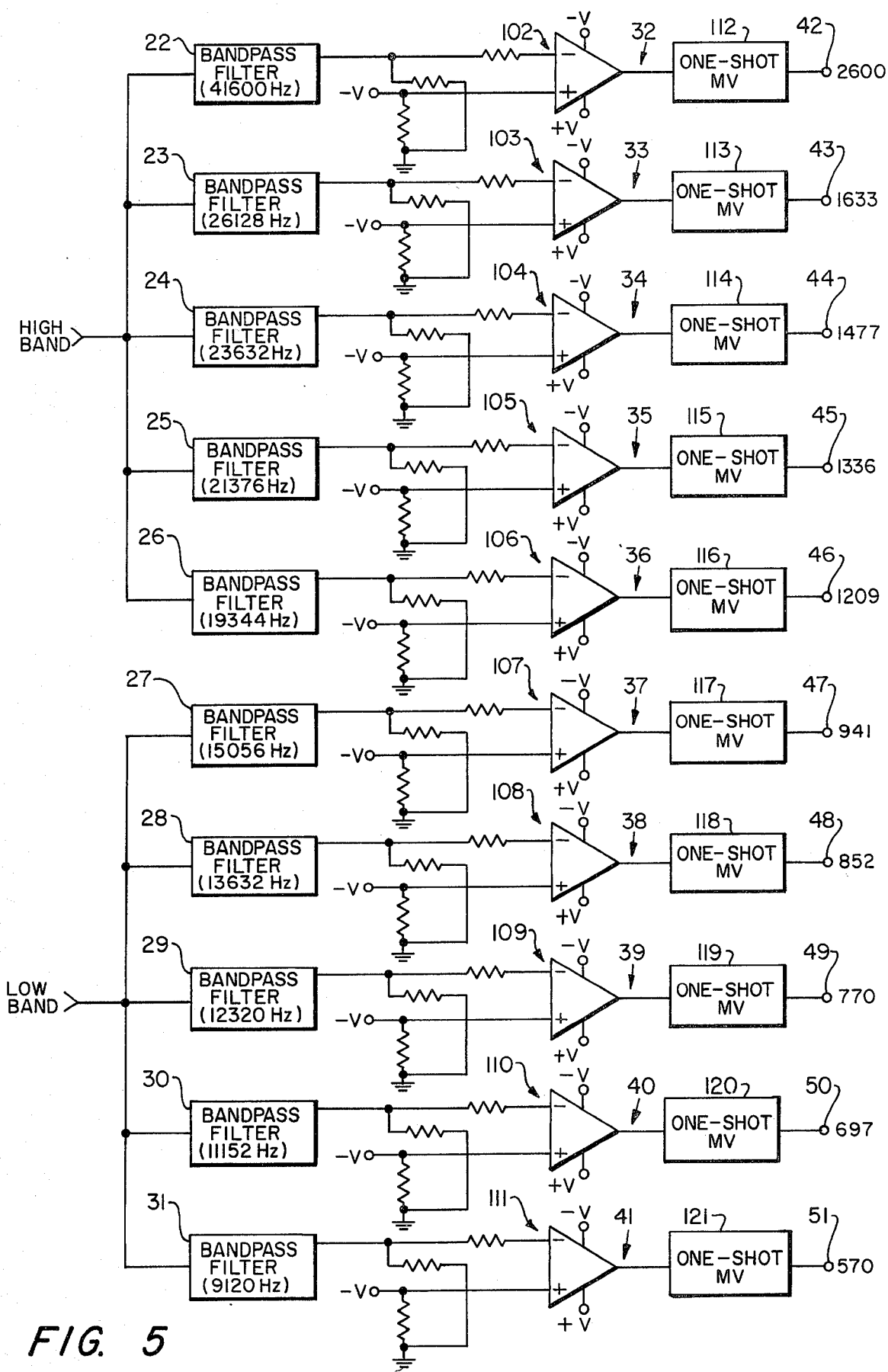

The HIGH BAND and LOW BAND signals from the limiters 98 and 99 are applied to tone filters as shown in FIG. 5. The HIGH BAND signal is applied in parallel to bandpass filters 22, 23, 24, 25, and 26 which pass frequencies of 41,600 Hz, 26,128 Hz, 23,632 Hz, 21,376 Hz, and 19,344 Hz, respectively. The LOW BAND signal is applied in parallel to bandpass filters 27, 28, 29, 30, and 31 which pass frequencies of 15,056 Hz, 13,632 Hz, 12,320 Hz, 11,152 Hz, and 9,120 Hz, respectively. The outputs of the bandpass filters 22-26 are applied to associated comparator circuits 102-106, respectively, and the outputs of bandpass filters 27-31 are applied to associated comparator circuits 107-111, respectively. The comparator circuits respond only to signals above a certain predetermined threshold level. Thus, each comparator circuit further ensures that the amplitude of the associated tone in the incoming signal is of sufficient magnitude to be a proper signal.

The outputs of the comparators 102-106 are applied to associated one-shot multivibrators 112-116, respectively, and the outputs of the comparators 107-111 are applied to associated one-shot multivibrators 117-121, respectively. The one-shot multivibrators have a timing cycle of approximately 370 microseconds, and thus output pulses from the comparator continually retrigger its associated multivibrator to hold in ON. While a multivibraor 112-116 and 117-121 is ON it produces a relatively high level signal at its output terminal 42-46 and 47-51, respectively, indicating the presence of the associated signal tone in the input signal at its associated receiver input line.

The indicating signal appears at the output of a multivibrator during a line readout period of 1.33 milliseconds (plus the 370 microseconds operating period of the multivibrator) while the data associated with the input line is being read out of memory. During the 1.33 millisecond period that an indicating signal is present, RCVR CODE signals RCVR $2^0$, RCVR $2^1$, and RCVR $2^2$ (shown in FIG. 6B) identifying the particular receiver input line are produced by the timing section. These signals indicate in binary digit form the specific receiver input line associated with the tone information being presented at the output terminals 42–51.

As shown in FIG. 6B a STROBE pulse is produced by the timing section near the end of each 1.33 millisecond line readout period. This pulse may be employed to strobe succeeding equipment to accept the output signals from the multivibrators together with the RCVR CODE. The identification of the receiver input line and the signalling tones present thereon may then be used in the usual well-known manner. Also in this particular embodiment, information is presented at the output terminals (with 50% overlap) during two separate line readout periods of a memory input period. Thus, a relatively large amount of data is provided to permit verification that the signal information is correct.

In summary, the receiver as described herein receives signalling tones on eight receiver input lines in parallel. The signal frequencies present on each line are sampled, converted to digital samples, and the digital samples are stored in a memory. The data is read out from the memory at 16 times the speed it was collected, and is converted to an analog signal with frequencies 16 times the tone frequencies from which it was derived. The analog signal is processed in a manner which is standard for processing signalling tones, except that the frequencies are greater by a factor of 16. The output information on the presence or absence of each of the signalling tones is presented in binary form in the usual well-known manner. Receiver input line address information pertaining to the signalling tone indications is presented simultaneously with the tone indications for processing by other equipment of the exchange in accordance with standard techniques. The receiver as described provides for a reduction in filters and other analog signalling circuitry to one-eighth of that previously required for receivers handling eight input lines. These components are responsible for most of the weight and volume of a receiver assembly. The additional circuitry required, although complex, is digital logic circuitry and is readily available as standard integrated circuit components of very small size. Thus, a substantial saving in volume and weight is obtained.

While there has been shown and described what is considered a preferred embodiment of the present invention, it will be obvious to those skilled in the art that various changes and modifications amy be made therein without departing from the invention as defined in the appended claims.

What is claimed is:

1. Receiver apparatus for detecting the presence of signals of predetermined frequencies on any of a plurality of receiver input lines including in combination
    multiplexing means for repeatedly sampling the receiver input lines in order and producing at its output connection analog samples of the input signals present on said receiver input lines;
    analog-to-digital converting means coupled to the output connection of the multiplexing means for converting each of said analog samples to a digital sample;
    memory means coupled to said analog-to-digital converting means for storing said digital samples;
    memory readout means for reading out of the memory means the digital samples associated with each of the receiver input lines, all of the samples associated with a receiver input line being read out for each receiver input line in turn, the digital samples associated with a receiver input line being read out in the same order as the analog samples associated with that receiver input line were produced by the multiplexing means;
    digital-to-analog converting means coupled to the memory readout means for converting each of said digital samples to an analog pulse;
    filter means coupled to the digital-to-analog converting means for converting the analog pulses associated with a receiver input line to an analog signal, the signal frequencies present in an analog signal being equal to the predetermined frequencies present in the associated input signal times an integral multiple of the number of receiver input lines;
    detecting means coupled to the filter means for determining the presence or absence of each of the signal frequencies in the analog signal and for producing indications thereof which indicate the presence or absence of each of the predetermined frequencies in the associated input signal;
    receiver identifying means for producing receiver identifying signals designating the particular receiver input line with which said indications are associated;
    said memory readout means being operable to readout in order from the memory means during a line readout period all the stored digital samples associated with a receiver input line starting with the oldest stored digital sample, the digital samples associated with each receiver input line in order being read out during successive line readout periods in a recurring sequence;
    said filter means being operable to convert the analog pulses associated with a receiver input line to an analog signal during a line readout period;
    said detecting means being operable to produce indications indicating the presence or absence of each of the predetermined frequencies in the associated input signal during a line readout period;
    said receiver identifying means being operable to produce receiver identifying signals designating the particular receiver input line with which said indications are associated during the line readout period while said indications are being produced;
    said multiplexing means being operable to sample a receiver input line and produce an analog sample during a data sampling period;
    said analog-to-digital converting means being operable to convert the analog sample produced during a data sampling period to a digital sample during the same data sampling period;
    memory input control means for writing a digital sample into the memory means during the same data sampling period it was produced;
    a multiplicity of digital samples associated with each of the receiver input lines being written into the memory means during a memory input period equal to a line readout period times an integral multiple (M) of the number (N) of receiver input lines; and said memory readout means being operable to read out a multiplicity of digital samples associated with a receiver input line from the memory means during a line readout period.

2. Receiver apparatus in accordance with claim 1 including timing means including means operable to cause said multiplexing means to sample a receiver input line during a data sampling period, a multiplicity of samples of the input signals on each of the plurality of receiver input lines being produced during a memory input period;

said timing means including means operable to cause said memory input control means to write a digital sample into the memory means during each data sampling period;

said timing means including means operable to cause said memory readout means to read out an integral number (M) of digital samples during each data sampling period; and said timing means including said receiver identifying means and being operable to produce a combination of signals during each line readout period to designate the particular receiver input line associated with the digital samples being read out of the memory means during the line readout period.

3. Receiver apparatus in accordance with claim 2 wherein said memory means includes a plurality of sets of storage locations, each set of storage locations being capable of storing a digital sample, the plurality of sets of storage locations being equal to the number of digital samples produced during a memory input period;

and including buffer means connected between said memory means and said digital-to-analog converting means for storing a single digital sample;

said timing means being operable during each of a number (M) of portions of each data sampling period to cause said memory readout means to read a digital sample out of a set of storage locations and place said digital sample in the buffer means, the digital samples read out during a data sampling period being a number (M) of samples in order associated with the same receiver input line; and said timing means being operable to cause said memory input control means to write the digital sample being produced by the analog-to-digital converting means into the memory means during another portion of the data sampling period.

4. Receiver apparatus in accordance with claim 3 including memory address control means coupled to said sets of storage locations and operable to address a different one of said sets of storage locations during said another portion of each data sampling period of a memory input period, the sets of storage locations being addressed in the same order during each memory input period;

said memory address control means being operable to address a different one of said sets of storage locations during each of said number (M) of portions of each data sampling period of a line readout period, every $N^{th}$ set of storage locations being addressed in order during a line readout period where N is the number of receiver input lines; and said memory address control means being operable to address the set of storage locations containing the oldest digital sample associated with a receiver input line during the first of the number (M) of portions of the first data sampling period of each line readout period, and being operable to address the sets of storage locations containing digital samples associated with a different receiver input line during each of the line readout periods of a sequence of N line readout periods.

5. Receiver apparatus in accordance with claim 4 wherein said detecting means includes a plurality of bandpass filter means, the plurality being equal to the number of predetermined frequencies, each bandpass filter means being capable of passing a different one of said signal frequencies; and a plurality of indicating means, each being coupled to a corresponding one of said bandpass filter means and being operable to produce a first signal condition at its output in response to the presence of a signal frequency passed by the corresponding bandpass filter means and to produce a second signal condition at its output in response to an absence of a signal frequency from the corresponding bandpass filter means.

6. Receiver apparatus in accordance with claim 5 wherein said detecting means includes a plurality of threshold means, each being connected between one of said bandpass filter means and the corresponding indicating means, said threshold means being operable to pass a signal frequency having an amplitude greater than a predetermined amplitude and to block a signal frequency having an amplitude less than the predetermined amplitude.

* * * * *